US012092049B1

(12) United States Patent
Mahadevan et al.

(10) Patent No.: US 12,092,049 B1
(45) Date of Patent: Sep. 17, 2024

(54) SYSTEM AND METHOD TO REDUCE FUEL CUT ENRICHMENT NON-METHANE HYDROCARBON EMISSIONS

(71) Applicant: FCA US LLC, Auburn Hills, MI (US)

(72) Inventors: Boopathi Singalandapuram Mahadevan, Ann Arbor, MI (US); Joshua Macchiavello, South Lyon, MI (US); Kevin C Ohlrogge, Highland, MI (US); Simon Omekanda, Oakland Township, MI (US); Jason E Wielenga, Jackson, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/459,509

(22) Filed: Sep. 1, 2023

(51) Int. Cl.

| | |
|---|---|
| ***F02D 41/12*** | (2006.01) |
| ***F02D 41/02*** | (2006.01) |
| ***F02D 41/14*** | (2006.01) |

(52) U.S. Cl.
CPC ....... *F02D 41/126* (2013.01); *F02D 41/0295* (2013.01); *F02D 41/1441* (2013.01); *F02D 2200/0814* (2013.01); *F02D 2200/1002* (2013.01); *F02D 2200/101* (2013.01); *F02D 2250/36* (2013.01)

(58) Field of Classification Search
CPC ............... F02D 41/126; F02D 41/0295; F02D 41/1441; F02D 2200/0814; F02D 2200/1002; F02D 2200/101; F02D 2250/36
See application file for complete search history.

(56) References Cited

U.S. PATENT DOCUMENTS

| | | | | |
|---|---|---|---|---|
| 11,512,658 | B2 * | 11/2022 | Inoshita | F02D 41/065 |
| 2011/0192144 | A1 * | 8/2011 | Yasui | F02D 41/1475 60/276 |
| 2017/0051693 | A1 * | 2/2017 | Szailer | F01N 13/008 |

* cited by examiner

*Primary Examiner* — Joseph J Dallo
(74) *Attorney, Agent, or Firm* — Jeremy J. Klobucar

(57) ABSTRACT

A control system for an engine of a vehicle includes one or more oxygen (O2) sensors disposed proximate to a three-way catalytic converter (TWC) in an exhaust system of the vehicle, the one or more O2 sensors each being configured to measure an O2 level of exhaust gas produced by the engine, and a controller in signal communication with the one or more O2 sensors. The controller is programmed to detect a fuel shut-off (FSO) event where the engine ceases providing fuel to the engine, determine an accumulated gas flow through the TWC during the FSO event, determine the FSO event has ended, and initiate a fuel enrichment event for a predetermined duration where the engine is supplied with a fuel enrichment level having a rich fuel/air ratio. The fuel enrichment level and the predetermined duration are chosen to reduce non-methane hydrocarbon (NMHC) emissions while maintaining NOx emission control.

18 Claims, 3 Drawing Sheets

SYSTEM AND METHOD TO REDUCE FUEL CUT ENRICHMENT NON-METHANE HYDROCARBON EMISSIONS

FIELD

The present application relates generally to vehicle engine exhaust treatment systems and, more particularly, to vehicle engine exhaust treatment systems to reduce non-methane hydrocarbon emissions.

BACKGROUND

Catalysts are typically implemented in vehicle exhaust systems for treating exhaust gas produced by an internal combustion engine to mitigate or eliminate emissions. A three-way catalytic converter (TWC) is a specific type of catalyst that is typically implemented in exhaust systems of vehicles having stoichiometric burn engines. The TWC is configured to oxidize carbon monoxide (CO) and unburnt hydrocarbons (HC) to produce carbon dioxide ($CO_2$) and water ($H_2O$), as well as reduce nitrogen oxides (NOx) to nitrogen ($N_2$). However, if the vehicle performs a fuel cut for example during deceleration, the TWC may become saturated with $O_2$, which does not favor NOx reduction reaction. To counter this issue, the engine is operated fuel rich, but this may result in excess non-methane hydrocarbon (NMHC) formation. Thus, while such conventional systems work for their intended purpose, it is desirable to provide continuous improvement in the relevant art.

SUMMARY

In accordance with one example aspect of the invention, a control system for an engine of a vehicle is provided. In one example implementation, the control system includes one or more oxygen ($O_2$) sensors disposed proximate to a three-way catalytic converter (TWC) in an exhaust system of the vehicle, the one or more $O_2$ sensors each being configured to measure an $O_2$ level of exhaust gas produced by the engine, and a controller in signal communication with the one or more $O_2$ sensors. The controller is programmed to detect a fuel shut-off (FSO) event where the engine ceases providing fuel to the engine, determine an accumulated gas flow through the TWC during the FSO event, determine the FSO event has ended, and initiate a fuel enrichment event for a predetermined duration where the engine is supplied with a fuel enrichment level having a rich fuel/air ratio. The fuel enrichment level and the predetermined duration are chosen to reduce non-methane hydrocarbon (NMHC) emissions while maintaining NOx emission control.

In addition to the foregoing, the described control system may include one or more of the following features: wherein the at least one $O_2$ sensor includes a first $O_2$ sensor and a second $O_2$ sensor; wherein the TWC includes a first catalyst disposed upstream of a second catalyst, and wherein the first $O_2$ sensor is disposed upstream of the first catalyst, and the second $O_2$ sensor is disposed downstream of the first catalyst and upstream of the second catalyst; wherein the controller is further programmed to determine the fuel enrichment level based on a lookup table of varying fuel enrichment levels as a function of the determined accumulated gas flow through the TWC during the FSO event; wherein the varying fuel enrichment levels are determined from a contour plot of NMHC emissions and NOx emissions for a given operating condition of the engine; and wherein the varying fuel enrichment levels are selected from an optimum zone of the contour plot where NMHC emissions are below a first predetermined level and NOx emissions are below a second predetermined level.

In addition to the foregoing, the described control system may include one or more of the following features: wherein the controller is further programmed to determine the predetermined duration of the fuel enrichment event based on a lookup table of varying durations as a function of (i) the determined accumulated gas flow through the TWC during the FSO event and (ii) current engine speed and load; wherein the predetermined duration is a flow threshold of gas flow through the TWC, and wherein the controller is further programmed to cease the fuel enrichment event when a gas flow through the TWC during the fuel enrichment event meets or exceeds the flow threshold; wherein the varying durations are determined from a contour plot of NMHC emissions and NOx emissions for a given operating condition of the engine; wherein the varying durations are selected from an optimum zone of the contour plot where NMHC emissions are below a first predetermined level and NOx emissions are below a second predetermined level.

In accordance with another example aspect of the invention, a method of performing a fuel enrichment event for an engine of a vehicle to reduce non-methane hydrocarbon (NMHC) emissions is provided. In one example implementation, the method includes providing a controller in signal communication with one or more oxygen ($O_2$) sensors disposed proximate to a three-way catalytic converter (TWC) in an exhaust system of the vehicle, the one or more $O_2$ sensors each being configured to measure an $O_2$ level of exhaust gas produced by the engine; detecting, by the controller, a fuel shut-off (FSO) event where the engine ceases providing fuel to the engine; determining, by the controller, an accumulated gas flow through the TWC during the FSO event; determining, by the controller, the FSO event has ended; and initiating, by the controller, a fuel enrichment event for a predetermined duration where the engine is supplied with a fuel enrichment level having a rich fuel/air ratio. The fuel enrichment level and the predetermined duration are chosen to reduce NMHC emissions while maintaining NOx emission control.

In addition to the foregoing, the described method may include one or more of the following features: wherein the at least one $O_2$ sensor includes a first $O_2$ sensor and a second $O_2$ sensor; wherein the TWC includes a first catalyst disposed upstream of a second catalyst, and wherein the first $O_2$ sensor is disposed upstream of the first catalyst, and the second $O_2$ sensor is disposed downstream of the first catalyst and upstream of the second catalyst; determining, by the controller, the fuel enrichment level based on a lookup table of varying fuel enrichment levels as a function of the determined accumulated gas flow through the TWC during the FSO event; wherein the varying fuel enrichment levels are determined from a contour plot of NMHC emissions and NOx emissions for a given operating condition of the engine; and wherein the varying fuel enrichment levels are selected from an optimum zone of the contour plot where NMHC emissions are below a first predetermined level and NOx emissions are below a second predetermined level.

In addition to the foregoing, the described method may include one or more of the following features: determining, by the controller, the predetermined duration of the fuel enrichment event based on a lookup table of varying durations as a function of (i) the determined accumulated gas flow through the TWC during the FSO event and (ii) current engine speed and load; wherein the predetermined duration is a flow threshold of gas flow through the TWC, the method further including ceasing, by the controller, the fuel enrichment event when a gas flow through the TWC during the fuel enrichment event meets or exceeds the flow threshold; wherein the varying durations are determined from a contour plot of NMHC emissions and NOx emissions for a given operating condition of the engine; and wherein the varying durations are selected from an optimum zone of the contour plot where NMHC emissions are below a first predetermined level and NOx emissions are below a second predetermined level.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously mentioned, some vehicle exhaust systems include a three-way catalytic converter (TWC) to convert exhaust gas constituents such as carbon monoxide (CO), carbon dioxide (CO2), oxygen (O2), hydrocarbons (HC), non-methane hydrocarbons (NMHC), and nitrogen oxides (NOx) to reduce emissions. Fuel cut or fuel shut-off (FSO) events, which typically occur during nearly closed throttle vehicle deceleration periods, involve operating the engine with a lean fuel/air ratio, which results in O2 accumulating in the TWC. Due to the accumulated O2, the FSO event may be followed by a fuel enrichment event, which involves operating the engine with a rich fuel/air ratio to increase CO and HC to react with the excess stored O2. Once the O2 level decreases, the engine returns to stoichiometric operation. However, the fuel enrichment event may potentially increase NMHC production and thus undesirable emissions.

Accordingly, the systems and methods described herein are configured to reduce fuel cut enrichment NMHC emissions while maintaining NOx emissions control. To monitor FSO and enrichment events, the system includes an upstream O2 sensor and a downstream O2 sensor to monitor exhaust gas O2 concentration upstream and downstream (or mid-catalyst) of the TWC. Once an FSO event is initiated, a controller monitors the O2 sensors to determine the amount of unburned gas going through the TWC. Based on this amount, the controller initiates an enrichment event with a reduced air/fuel ratio than utilized during a typical enrichment event. The controller monitors the downstream O2 sensor to determine if it has reached a predetermined normal operation O2 level. Once the downstream O2 sensor returns to the normal level, a point where a typical enrichment event would be canceled, the controller continues the reduced air/fuel event for a predetermined period of time. As a result, this prolonged, reduced enrichment event reduces NMHC emissions while maintaining NOx emissions control.

In one example, the FSO event is initiated and the amount of gas (airflow) going through the TWC is measured or estimated. The amount of flow going through the catalyst after the mid-brick (downstream) O2 sensor voltage going over a threshold is based on leftover oxygen storage capacity of the catalyst. This flow value is determined by modulating the fuel cut duration from a minimum level (e.g., one second) to a maximum level (e.g., twenty seconds). The optimum value is selected based on the resulting least NMHC, which is a function of the magnitude of the fuel enrichment post rich sensor response and the duration of the enrichment.

Figure 1:
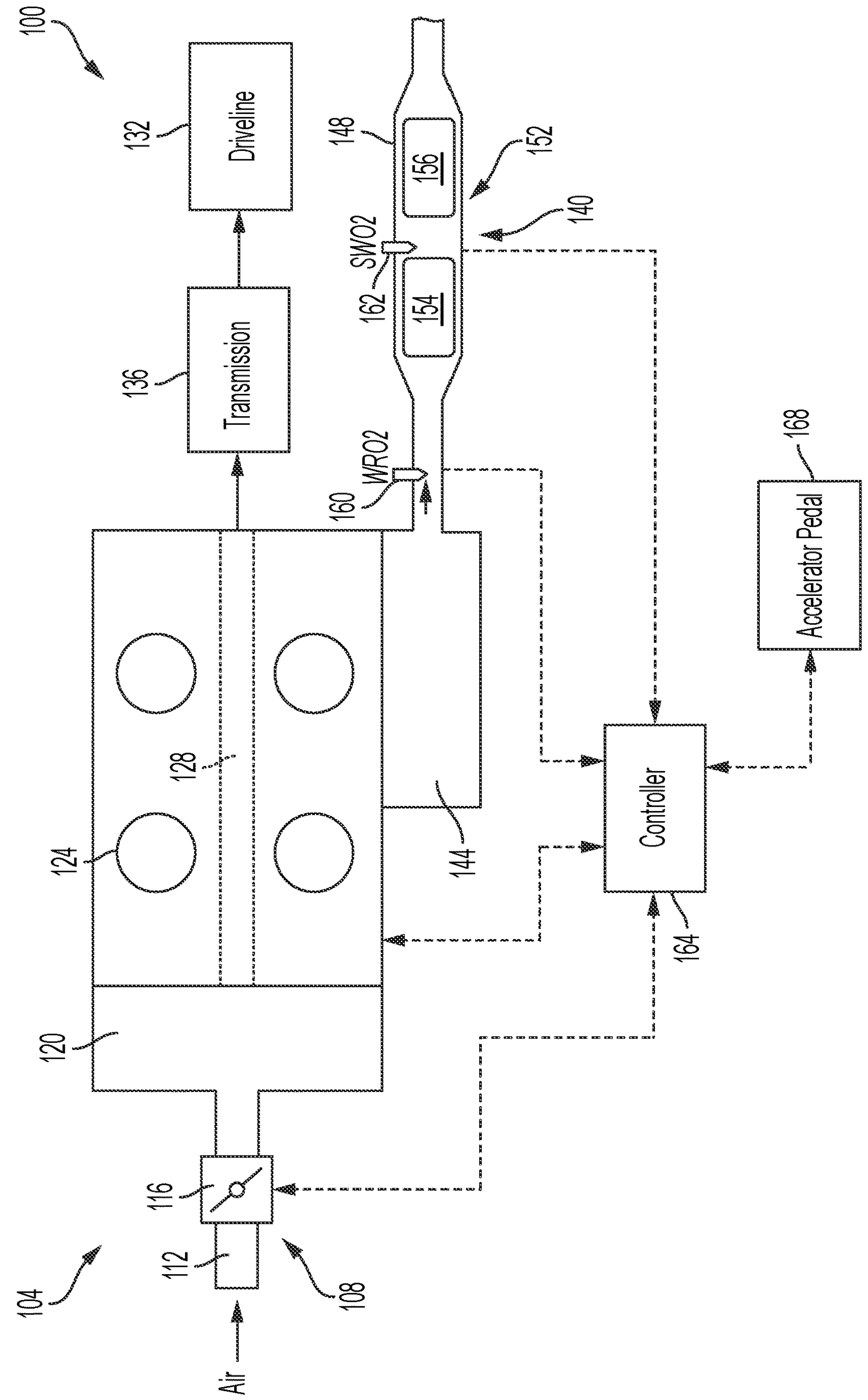
FIG. 1 is a schematic diagram of an example vehicle having a stoichiometric combustion engine and an exhaust system in accordance with the principles of the present application.

Referring now to FIG. 1, a diagram of an example vehicle 100 is illustrated. The vehicle 100 comprises a stoichiometric combustion engine 104 capable of operating with a rich fuel/air ratio. Non-limiting examples of a type of fuel that the engine 104 could utilize include gasoline, compressed natural gas (CNG), and liquefied natural gas (LNG). The engine 104 draws air through an induction system 108 comprising an induction passage 112, a throttle valve 116, and an intake manifold 120. The air in the intake manifold 120 is dispersed to cylinders 124 and combined with fuel to form a fuel/air mixture that is combusted (e.g., by spark plugs) within cylinders 124 to drive pistons (not shown) that rotatably turn a crankshaft 128 generating drive torque. While four cylinders are shown, it will be appreciated that the engine 104 could include any suitable number of cylinders (six, eight, etc.).

The drive torque is transferred to a driveline 132 via a transmission 136. It will be appreciated that the vehicle 100 could have a hybrid driveline where the drive torque generated by the engine 104 is transferred to an electric motor or generator instead of or in addition to the transmission 136. Exhaust gas resulting from combustion is expelled from the cylinders 124 into an exhaust system 140. The exhaust system 140 comprises an exhaust manifold 144, an exhaust passage 148, and a TWC 152 disposed along the exhaust passage 148 and configured to mitigate or eliminate CO, HC, NMHC, and NOx in the exhaust gas.

The TWC 152 includes an upstream brick or catalyst 154 and a downstream brick or catalyst 156 for catalytic reactions. As previously discussed, the TWC 152 oxidizes the CO and HC (i.e., combines them with O2) to produce carbon dioxide (CO2) and water (H2O), and the TWC 152 reduces the NOx to nitrogen (N2) and O2. The exhaust system 140 further comprises an upstream exhaust gas O2 sensor 160 and a downstream exhaust gas O2 sensor 162. In the example embodiment, O2 sensor 160 is disposed upstream of the first catalyst 154, and the second O2 sensor 162 is disposed "mid-brick" between the first and second catalysts 154, 156. It will be appreciated that the techniques of the present disclosure could be achieved using only one of these sensors 160, 162 (e.g., to save costs). However, utilizing both of the sensors 160, 162 may increase the accuracy and/or robustness of the techniques. It will be appreciated that the O2 sensors 160, 162 could be linear-type O2 sensors, switching-type O2 sensors, or some combination thereof. Whereas a switching-type O2 sensor switches its output in response to rich and lean fuel/air (FA) ratio transitions, a linear-type O2 sensor could output a voltage indicative of the FA ratio and thus this voltage could be monitored to determine when it passes through a voltage level associated with stoichiometry.

A controller 164 (e.g., ECU) controls operation of the engine 104, such as controlling airflow/fueling/spark to achieve a desired drive torque. This desired drive torque could be based, for example, on input provided by a driver of the vehicle 100 via an accelerator pedal 168. The controller 164 controls the engine 104 to perform fuel enrichment events (rich fuel/air ratio operation, such as for increased power or exhaust gas cooling) and fuel cutoff events (lean fuel/air ratio operation, such as no fuel being injected during pedal-off deceleration). The controller 164 also implements at least a portion of the techniques of the present disclosure, which are described in greater detail below with respect to FIG. 2.

Figure 2:
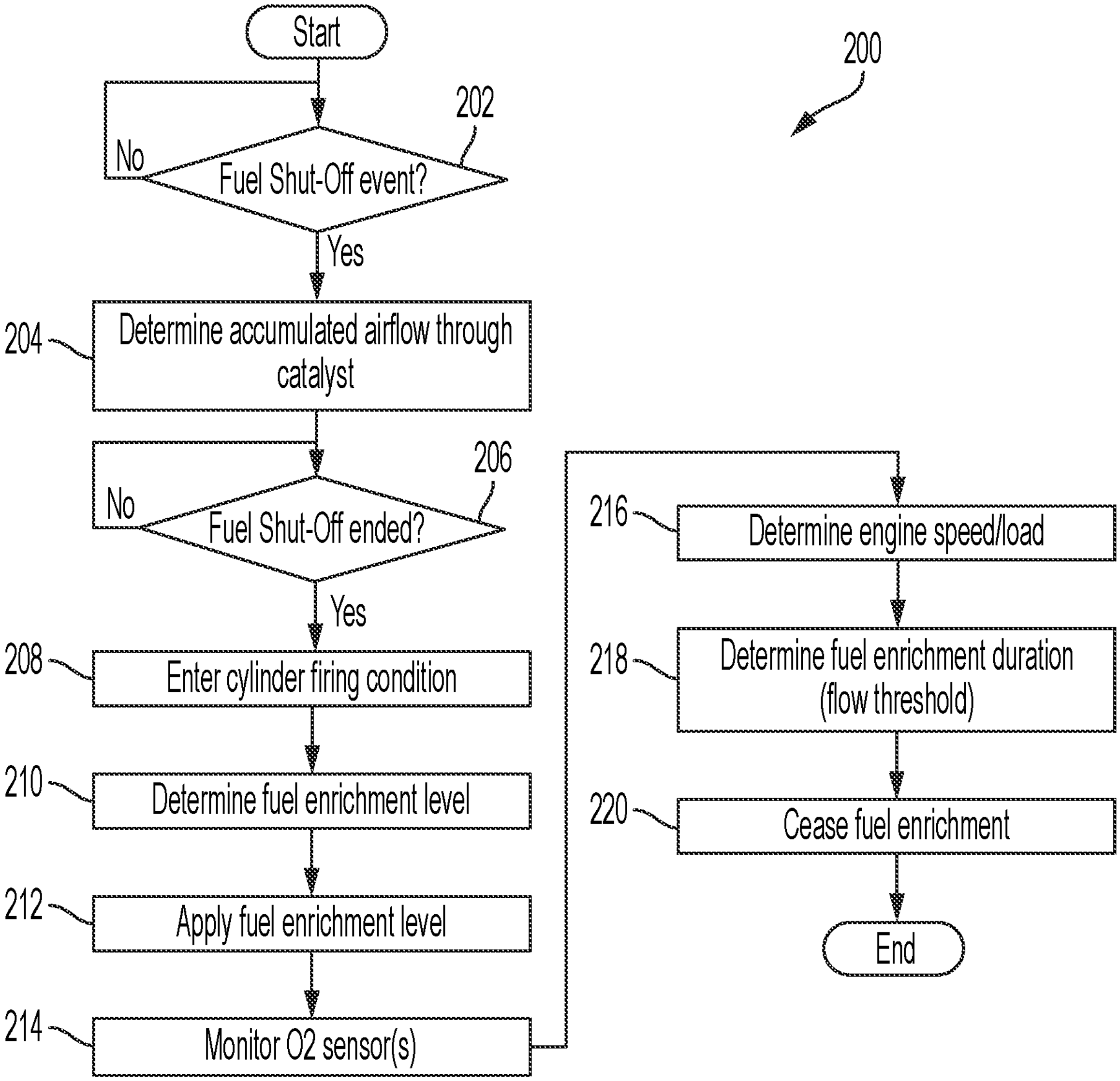
FIG. 2 is a flow diagram of an example method of reducing fuel cut enrichment NMHC emissions, in accordance with the principles of the present application.

Referring now to FIG. 2, a flow diagram of an example method 200 of reducing fuel cut enrichment NMHC emissions while maintaining NOx emissions control is presented. At 202, controller 164 determines if an FSO event has been initiated. If no, control returns to step 202. If yes, at step 204, controller 164 determines how much airflow is passing through the TWC 152 during the FSO event. In one example, the estimated airflow is model-based (stored in ECU 164) and depends at least in part on engine speed during the FSO event. The estimated airflow is integrated over the duration of the FSO event to determine an Integrated DFSO gas flow (e.g., in grams). At step 206, controller 164 determines whether the FSO event has ended. The FSO event may end, for example, when the driver presses the accelerator pedal 168. If no, controller 164 continues to measure the airflow through the TWC 152. If yes, at step 208, controller 164 initiates fuel flow and fires the cylinders 124.

At step 210, controller 164 determines a level of fuel enrichment to apply to the TWC 152 to react with the excess O2 accumulated/stored in the TWC 152 during the FSO event. The level of fuel enrichment is based on the Integrated DFSO gas flow determined in step 204. In one example, the fuel enrichment is determined from a lookup table (e.g., stored in controller 164). An example lookup table is shown below (Table 1) where the amount of fuel enrichment, as a percentage above stoichiometric, is selected as a function of the accumulated gas flow (in grams) through the TWC 152 during the FSO event. For example, as shown in Table 1, if the determined Integrated DFSO gas flow is 0.5, then controller 164 determines that a fuel enrichment level of 10% should be applied to the exhaust flow based on the lookup table.

TABLE 1

| | | | | | |
|---|---|---|---|---|---|
| X - Integrated DFSO gas flow (g) | 0.1 | 0.5 | 3 | 6 | 10 |
| Y - Fuel Enrichment (%) | 5 | 10 | 15 | 20 | 20 |

At step 212, controller 164 applies the selected fuel enrichment level from step 210. At step 214, controller 164 monitors the downstream O2 sensor 162. The downstream O2 voltage reads low (e.g., <0.3 V) when the TWC 152 is saturated with the oxygen, and the voltage increases (e.g., >0.6 V) when the oxygen storage is at an optimum level for TWC conversion. Since there is another catalyst 156 downstream of the downstream O2 sensor 162, the additional fuel enrichment beyond the low reading (e.g., 0.3 V) does not produce significant emissions within the certain amount of flow (e.g., a flow threshold 1 or FL1). At step 216, controller 164 determines current engine speed and load in gas flow units (e.g., grams/second) during the fuel enrichment event. In one example, this is determined using a model stored in the controller 164.

At step 218, controller 164 determines a duration for which to operate the fuel enrichment event. This duration may also be referred to as the "flow threshold" where, for example, the FSO accumulated O2 in TWC 152 is depleted. As such, controller 164 determines an integrated (accumulated) gas flow at the selected fuel enrichment level that is sufficient to counter the O2 accumulation during the FSO event. In one example, this is determined from a lookup table (e.g., stored in controller 164). An example lookup table is shown below (Table 2) with duration/flow threshold as a function of Integrated DFSO gas flow and engine operating load. The x-axis (top row) shows various values of Integrated DFSO gas flow (e.g., in grams), which can be measured during the FSO event (step 204). The y-axis (first column) shows various values of gas flow units (e.g., grams/second) estimated by controller 164 at current engine speed and load (step 216). The remaining cells corresponding to the various x/y values show the duration of integrated gas flow through the catalyst (e.g., in grams). For example, as shown in Table 2, if the determined Integrated DFSO gas flow (x-axis) is 10 grams (step 204) and the determined engine load (step 216) is 25 grams/see, the duration of integrated gas flow through TWC 152 is 13 grams. In other words, the fuel enrichment event is operated for a duration (flow threshold) of 13 grams of accumulated gas flow through the TWC 152.

TABLE 2

| y\x | 0 | 10 | 20 | 30 |
|---|---|---|---|---|
| 0 | 5 | 7 | 9 | 11 |
| 25 | 10 | 13 | 15 | 17 |
| 50 | 15 | 17 | 19 | 21 |
| 75 | 20 | 23 | 25 | 27 |
| 100 | 25 | 27 | 29 | 31 |

At step 220, controller 164 ceases the fuel enrichment event based on the threshold flow response. For example, controller 164 ceases the fuel enrichment event when the accumulated gas flow through the TWC 152 during the fuel enrichment event meets or exceeds the flow threshold (the x/y value determined in Table 2, step 218).

In order to reduce NMHC emissions during the fuel enrichment event, the various fuel enrichment levels (Table 1) and duration/flow threshold (Table 2) are calibrated/optimized before the lookup tables are populated with those values. In the example embodiment, the optimum value of fuel enrichment (EN1) (y-axis of Table 1) and the optimum value of flow threshold (FL1) (the x/y cells of Table 2) is determined using a contour plot 300 of NOX and NMHC, shown in FIG. 3.

Figure 3:
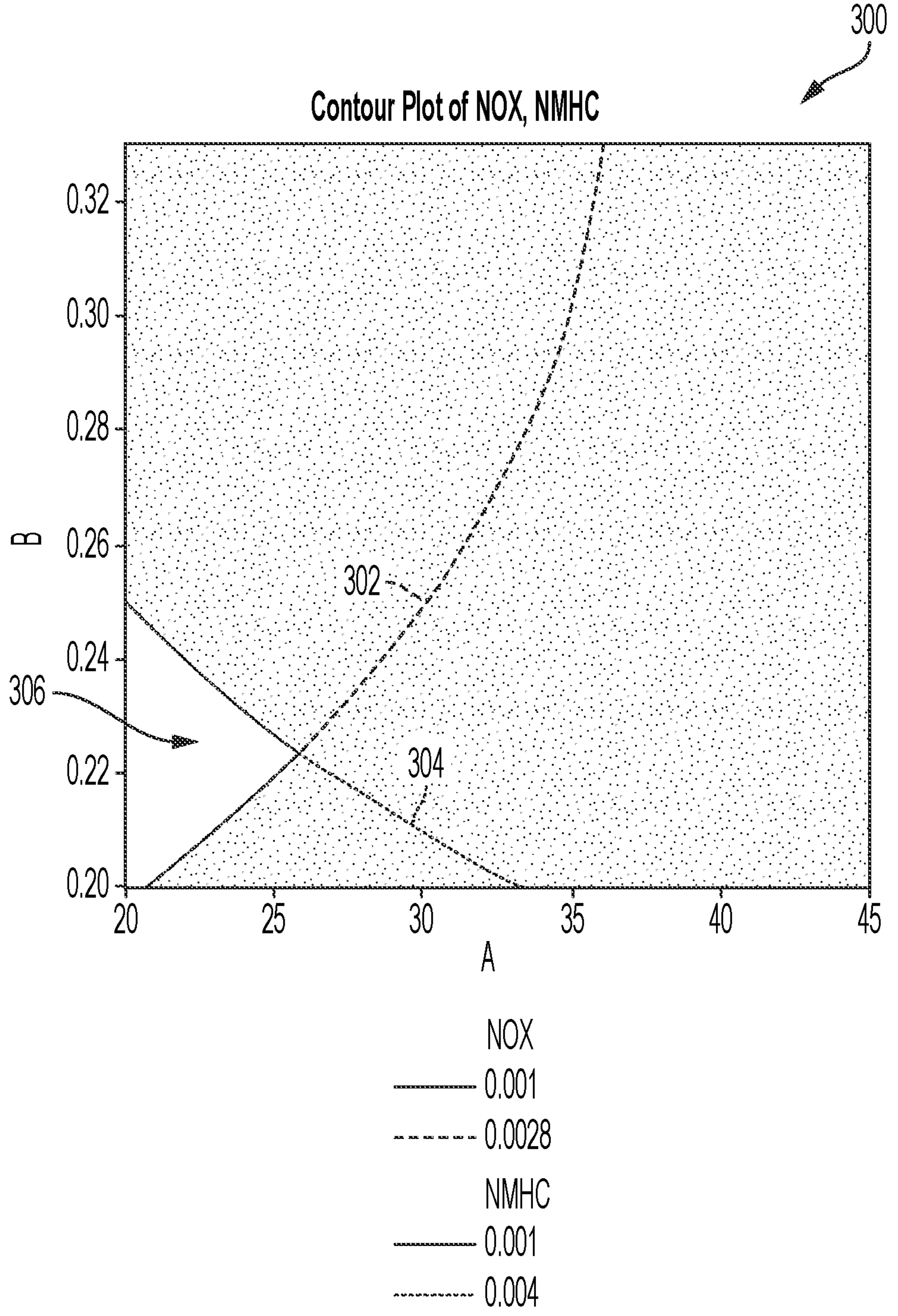
FIG. 3 illustrates an example contour plot of NMHC and NOx, in accordance with the principles of the present application.

With additional reference to FIG. 3, in one example, the x/y cell values in the lookup table (Table 2) are calibrated/optimized such that the fuel enrichment level (Table 1) is applied for the flow period in Table 2 to minimize NMHC emissions. As such, the value of each x/y cell is optimized at each operating condition, which is determined as a selected vehicle speed, engine speed and load condition, or engine load (y-axis of Table 2). At each operating condition (y-axis), the FSO is activated for the varying duration (x-axis), and the optimum fuel enrichment level (EN1) and flow threshold (FL1) are chosen from the contour plot 300.

In the example of FIG. 3, the contour plot 300 illustrates a predetermined acceptable NOx emission level 302 and a predetermined acceptable NMHC emission level 304 for a given flow threshold (FL1) (x-axis) and a given fuel enrichment level (EN1) (y-axis). Acceptable NOx emissions are illustrated below line 302 (e.g., left of) and acceptable NMHC levels are shown below line 304. As such, an optimum zone 306 (white space) is defined where the flow threshold FL1 and fuel enrichment EN1 are producing lower NMHC emissions at similar or lower conventional NOx levels. For example, for the given operating condition and FSO event shown in FIG. 3, an example optimum value for the flow threshold FL1 is 20 g and an example optimum value for the fuel enrichment EN1 is 0.22 (22%), which is within the optimum zone 306 to lower NMHC emissions while maintaining desired/required NOx emissions levels.

Described herein are systems and methods for reducing NMHC emissions during a fuel enrichment event that occurs in response to a FSO event. The system allows continued fuel enrichment at a selected level for a specified cumulative gas flow through the catalyst after identifying the rich response at the mid brick O2 sensor. The enrichment levels during these conditions are lower than conventional fuel enrichment processes, which terminate enrichment upon a normal O2 response of the mid brick sensor. As such, the system produces reduced NMHC emissions while maintaining NOx emissions levels similar to conventional operations.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A control system for an engine of a vehicle, the control system comprising:
- one or more oxygen (O2) sensors disposed proximate to a three-way catalytic converter (TWC) in an exhaust system of the vehicle, the one or more O2 sensors each being configured to measure an O2 level of exhaust gas produced by the engine; and
- a controller in signal communication with the one or more O2 sensors and programmed to:
  - detect a fuel shut-off (FSO) event where the engine ceases providing fuel to the engine;
  - determine an accumulated gas flow through the TWC during the FSO event;
  - determine the FSO event has ended; and
  - initiate a fuel enrichment event for a predetermined duration where the engine is supplied with a fuel enrichment level having a rich fuel/air ratio,
  - wherein the fuel enrichment level is selected from a lookup table of varying fuel enrichment levels as a function of the determined accumulated gas flow through the TWC during the FSO event,
  - wherein the varying fuel enrichment levels of the lookup table provide a least resulting non-methane hydrocarbon (NMHC) emission while maintaining a predetermined acceptable NOx emission level,
  - wherein the fuel enrichment level and the predetermined duration are selected to reduce NMHC emissions while maintaining NOx emission control.

2. The control system of claim 1, wherein the at least one O2 sensor includes a first O2 sensor and a second O2 sensor.

3. The control system of claim 2, wherein the TWC includes a first catalyst disposed upstream of a second catalyst, and
- wherein the first O2 sensor is disposed upstream of the first catalyst, and the second O2 sensor is disposed downstream of the first catalyst and upstream of the second catalyst.

4. The control system of claim 1, wherein the varying fuel enrichment levels are determined from a contour plot of NMHC emissions and NOx emissions for a given operating condition of the engine.

5. The control system of claim 4, wherein the varying fuel enrichment levels are selected from an optimum zone of the contour plot where NMHC emissions are below a first predetermined level and NOx emissions are below a second predetermined level.

6. The control system of claim 1, wherein the controller is further programmed to determine the predetermined duration of the fuel enrichment event based on a second lookup table of varying durations as a function of (i) the determined accumulated gas flow through the TWC during the FSO event and (ii) current engine speed and load.

7. The control system of claim 6, wherein the predetermined duration is a flow threshold of gas flow through the TWC, and
- wherein the controller is further programmed to cease the fuel enrichment event when a gas flow through the TWC during the fuel enrichment event meets or exceeds the flow threshold.

8. The control system of claim 6, wherein the varying durations are determined from a contour plot of NMHC emissions and NOx emissions for a given operating condition of the engine.

9. The control system of claim 8, wherein the varying durations are selected from an optimum zone of the contour plot where NMHC emissions are below a first predetermined level and NOx emissions are below a second predetermined level.

10. A method of performing a fuel enrichment event for an engine of a vehicle to reduce non-methane hydrocarbon (NMHC) emissions, the method comprising:
- providing a controller in signal communication with one or more oxygen (O2) sensors disposed proximate to a three-way catalytic converter (TWC) in an exhaust system of the vehicle, the one or more O2 sensors each being configured to measure an O2 level of exhaust gas produced by the engine;

detecting, by the controller, a fuel shut-off (FSO) event where the engine ceases providing fuel to the engine;

determining, by the controller, an accumulated gas flow through the TWC during the FSO event;

determining, by the controller, the FSO event has ended;

initiating, by the controller, a fuel enrichment event for a predetermined duration where the engine is supplied with a fuel enrichment level having a rich fuel/air ratio, and selecting, by the controller, the fuel enrichment level from a lookup table of varying fuel enrichment levels as a function of the determined accumulated gas flow through the TWC during the FSO event, wherein the varying fuel enrichment levels of the lookup table provide a lowest resulting NMHC emission while maintaining a predetermined acceptable NOx emission level for that engine operating condition, wherein the fuel enrichment level and the predetermined duration are selected to reduce NMHC emissions while maintaining NOx emission control.

11. The method of claim 10, wherein the at least one O2 sensor includes a first O2 sensor and a second O2 sensor.

12. The method of claim 11, wherein the TWC includes a first catalyst disposed upstream of a second catalyst, and wherein the first O2 sensor is disposed upstream of the first catalyst, and the second O2 sensor is disposed downstream of the first catalyst and upstream of the second catalyst.

13. The method of claim 10, wherein the varying fuel enrichment levels are determined from a contour plot of NMHC emissions and NOx emissions for a given operating condition of the engine.

14. The method of claim 13, wherein the varying fuel enrichment levels are selected from an optimum zone of the contour plot where NMHC emissions are below a first predetermined level and NOx emissions are below a second predetermined level.

15. The method of claim 13, further comprising determining, by the controller, the predetermined duration of the fuel enrichment event based on a second lookup table of varying durations as a function of (i) the determined accumulated gas flow through the TWC during the FSO event and (ii) current engine speed and load.

16. The method of claim 15, wherein the predetermined duration is a flow threshold of gas flow through the TWC, the method further comprising:

ceasing, by the controller, the fuel enrichment event when a gas flow through the TWC during the fuel enrichment event meets or exceeds the flow threshold.

17. The method of claim 15, wherein the varying durations are determined from the contour plot of NMHC emissions and NOx emissions for a given operating condition of the engine.

18. The method of claim 17, wherein the varying durations are selected from the optimum zone of the contour plot where NMHC emissions are below the first predetermined level and NOx emissions are below the second predetermined level.

* * * * *